C. A. Fisher,
Hay Knife,
№ 82,505. Patented Sep. 29, 1868.
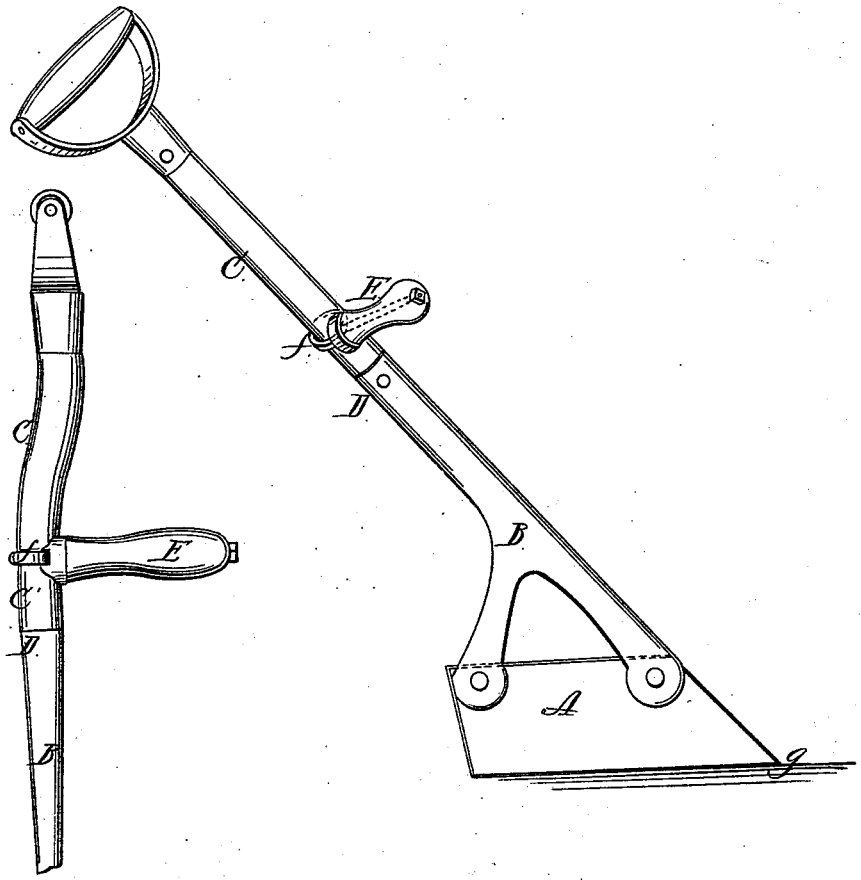
Witnesses:
Wm A. Morgan
J. C. Cotton
Inventor:
C. A. Fisher
per Munn & Co
Attorneys

United States Patent Office.

CHARLES A. FISHER, OF GENESEO, ILLINOIS.

Letters Patent No. 82,505, dated September 29, 1868.

---

IMPROVEMENT IN HAY-KNIVES.

---

The Schedule referred to in these Letters Patent and making part of the same.

---

TO ALL WHOM IT MAY CONCERN:

Be it known that I, CHARLES A. FISHER, of Geneseo, in the county of Henry, and State of Illinois, have invented a new and improved Hay-Knife; and I do hereby declare that the following is a full, clear, and exact description thereof, which will enable those skilled in the art to make and use the same, reference being had to the accompanying drawings, forming part of this specification.

This invention relates to the construction of a knife for cutting hay, but relating more particularly to the handle thereof, and the manner of its connection with the shank of the knife; the invention consisting in improvements made on a hay-knife of similar construction, for which I have already received Letters Patent of the United States.

The drawing—

Figure 1, gives a longitudinal view of a hay-knife constructed according to my invention.

Figure 2 is an edge view of the same.

Similar letters of reference indicate corresponding parts.

A is the blade, which is attached to a forked shank, B.

C is the handle, which is of wood, and inserted into a socket, D, in the shank.

E is a bearing-handle, which is attached to the handle C by a band, $f$.

The lower forward corner of the blade A forms an acute angle, $g$, for the purpose of more readily penetrating the hay, and the blade is attached to the shank B, and to the brace B', by rivets or screws, as may be most convenient.

At the upper end of the shank there is a socket, which receives the handle C, and the handle is fastened in the socket by a pin, or in any other suitable manner.

The handle C is bent (as seen in fig. 2) at $c'$, so as to protect the hand of the operator from the hay when the knife is in use.

The handle C is made of wood, whereby it is rendered lighter, and better adapted to the purpose intended than one made of metal.

I claim as new, and desire to secure by Letters Patent—

The socket D, the wooden handle C, the bend C', and the blade A, when the same are formed and combined, substantially as shown and described, for the purposes set forth.

CHARLES A. FISHER.

Witnesses:
  CHARLES SMITH,
  CHAS. FENDREW.